(12) United States Patent
Satonaga et al.

(10) Patent No.: US 8,145,955 B2
(45) Date of Patent: Mar. 27, 2012

(54) MONITORING APPARATUS, INFORMATION PROCESSING SYSTEM, MONITORING METHOD AND COMPUTER READABLE MEDIUM

(75) Inventors: Tetsuichi Satonaga, Ashigarakami-gun (JP); Masayasu Takano, Ebina (JP); Noriyuki Matsuda, Ebina (JP); Akiko Seta, Ebina (JP); Koji Adachi, Ashigarakami-gun (JP); Kaoru Yasukawa, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 219 days.

(21) Appl. No.: 12/559,911

(22) Filed: Sep. 15, 2009

(65) Prior Publication Data
US 2010/0211814 A1    Aug. 19, 2010

(30) Foreign Application Priority Data

Feb. 13, 2009    (JP) .................................. 2009-031742

(51) Int. Cl.
*G06F 11/00* (2006.01)
(52) U.S. Cl. ........................................................ 714/48
(58) Field of Classification Search ...................... 714/44
See application file for complete search history.

(56) References Cited

U.S. PATENT DOCUMENTS

| | | | | |
|---|---|---|---|---|
| 5,923,834 | A * | 7/1999 | Thieret et al. ..................... 714/25 |
| 6,373,383 | B1 * | 4/2002 | Arrowsmith et al. .......... 340/506 |
| 6,782,495 | B2 * | 8/2004 | Bernklau-Halvor ............ 714/44 |
| 7,340,648 | B2 * | 3/2008 | Asauchi ........................... 714/26 |
| 7,613,949 | B1 * | 11/2009 | Boone et al. ..................... 714/25 |
| 7,680,753 | B2 * | 3/2010 | Sudhindra et al. ............... 706/45 |
| 7,702,960 | B2 * | 4/2010 | Prescott et al. ............ 714/38.11 |
| 7,908,525 | B2 * | 3/2011 | Fujishita .......................... 714/48 |
| 7,970,594 | B2 * | 6/2011 | Gaudette .......................... 703/13 |
| 2004/0109699 | A1 * | 6/2004 | Skrainar et al. .................... 399/9 |
| 2004/0181712 | A1 | 9/2004 | Taniguchi et al. |
| 2005/0267702 | A1 * | 12/2005 | Shah et al. ....................... 702/81 |
| 2005/0281596 | A1 * | 12/2005 | Nakagawa et al. ........... 399/350 |
| 2009/0034990 | A1 * | 2/2009 | Nakazato et al. .................. 399/9 |
| 2011/0145640 | A1 * | 6/2011 | Hooks ............................. 714/26 |

FOREIGN PATENT DOCUMENTS

JP    2004-213618 A    7/2004
JP    2007-328641 A    12/2007

OTHER PUBLICATIONS

Noriyuki Matsuda; et al.; "Monitoring Device, Information Processing System and Computer Readable Medium"; Filed Sep. 15, 2009; U.S. Appl. No. 12/560,003.

* cited by examiner

*Primary Examiner* — Robert Beausoliel, Jr.
*Assistant Examiner* — Neil Miles
(74) *Attorney, Agent, or Firm* — Sughrue Mion, PLLC

(57) ABSTRACT

A monitoring apparatus includes: a reception section that receives information including first use mode information from an first information processing apparatus; a storage section that stores the first use mode information received by the reception section; and a transmission section, when the reception section receives fault information together with the first use mode information from the first information processing apparatus, that transmits information concerning countermeasures against a fault to the first information processing apparatus based on the first use mode information and pieces of second use mode information, stored in the storage section, of second information processing apparatuses which normally operate.

6 Claims, 13 Drawing Sheets

FIG. 9

| APPARATUS ID | TROUBLE INFORMATION | PRODUCTION DATE | NUMBER OF COLOR SHEETS | NUMBER OF MONOCHROME SHEETS | NUMBER OF DRUM CYCLES |
|---|---|---|---|---|---|
| 901 | 902 | 903 | 904 | 905 | 906 |
| 1114741 | AAA | 2008/03/08 | 152 | 10221 | 20584 |
| 1874119 | AAA | 2008/03/05 | 2274 | 5684 | 16334 |
| 2257412 | AAA | 2008/03/05 | 1589 | 30994 | 71400 |
| 1988741 | BBB | 2008/03/10 | 104 | 8554 | 15287 |
| ... | ... | ... | ... | ... | ... |
| 2336471 | ZZZ | 2008/03/08 | 3881 | 101221 | 257510 |
| M/C-1 | — | 2008/05/01 | 125 | 7654 | 13658 |
| ... | ... | ... | ... | ... | ... |
| M/C-10 | — | 2008/03/07 | 750 | 11337 | 27510 |

FIG. 10

| TROUBLE INFORMATION (1001) | APPARATUS ID (1002) | NUMBER OF MONOCHROME SHEETS (X) (1003) | NUMBER OF DRUM CYCLES (Y) (1004) |
|---|---|---|---|
| AAA | 1114741 | 10221 | 20584 |
| AAA | 1874119 | 5684 | 16334 |
| AAA | 2257412 | 30994 | 71400 |
| — | M/C-1 | 7654 | 13658 |
| — | ... | ... | ... |
| — | M/C-10 | 11337 | 27510 |

FIG. 11

| TROUBLE INFORMATION (1101) | TROUBLE COUNTERMEASURE DESCRIPTION (1102) |
|---|---|
| AAA | SET SETUP VALUE X to $\alpha$ |
| BBB | REPLACE WITH PRODUCT OF NEWEST VERSION |
| ... | ... |
| ZZZ | SET SETUP VALUE Z TO $\gamma$ |

MONITORING APPARATUS, INFORMATION PROCESSING SYSTEM, MONITORING METHOD AND COMPUTER READABLE MEDIUM

CROSS-REFERENCE TO RELATED APPLICATIONS

This application is based on and claims priority under 35 USC 119 from Japanese Patent Application No. 2009-031742 filed on Feb. 13, 2009.

BACKGROUND

1. Technical Field

This invention relates to a monitoring apparatus, an information processing system, a monitoring method and a computer readable medium.

2. Related Art

In an image forming apparatus for performing print processing, etc., various settings and adjustments are made in response to the use mode of the image forming apparatus according to the use environment, the use condition, and the use frequency of the image forming apparatus. For example, the image forming apparatus is used in a state of a comparatively high temperature in a server room, etc., an environment of high humidity or violent vibrations in a factory, etc.

The settings and adjustments responsive to the use environments are made for each image forming apparatus according to installation and given-term use of the image forming apparatus.

SUMMARY

According to an aspect of the invention, a monitoring apparatus includes: a reception section that receives information including first use mode information from an first information processing apparatus; a storage section that stores the first use mode information received by the reception section; and a transmission section, when the reception section receives fault information together with the first use mode information from the first information processing apparatus, that transmits information concerning countermeasures against a fault to the first information processing apparatus based on the first use mode information and pieces of second use mode information, stored in the storage section, of second information processing apparatuses which normally operate.

BRIEF DESCRIPTION OF THE DRAWINGS

Exemplary embodiment(s) of the present invention will be described in detail based on the following figures, wherein:

FIG. 9 is a drawing to show an example of use mode information and trouble information;

FIG. 10 is a drawing provided by summarizing information used to create a trouble prediction expression by a trouble prediction expression creation section 807;

FIG. 11 is a drawing to show an example of the descriptions of trouble countermeasures;

DETAILED DESCRIPTION

An exemplary embodiment of a monitoring apparatus, an information processing system, and a program according to the invention will be discussed in detail with reference to the accompanying drawings.

Figure 1:
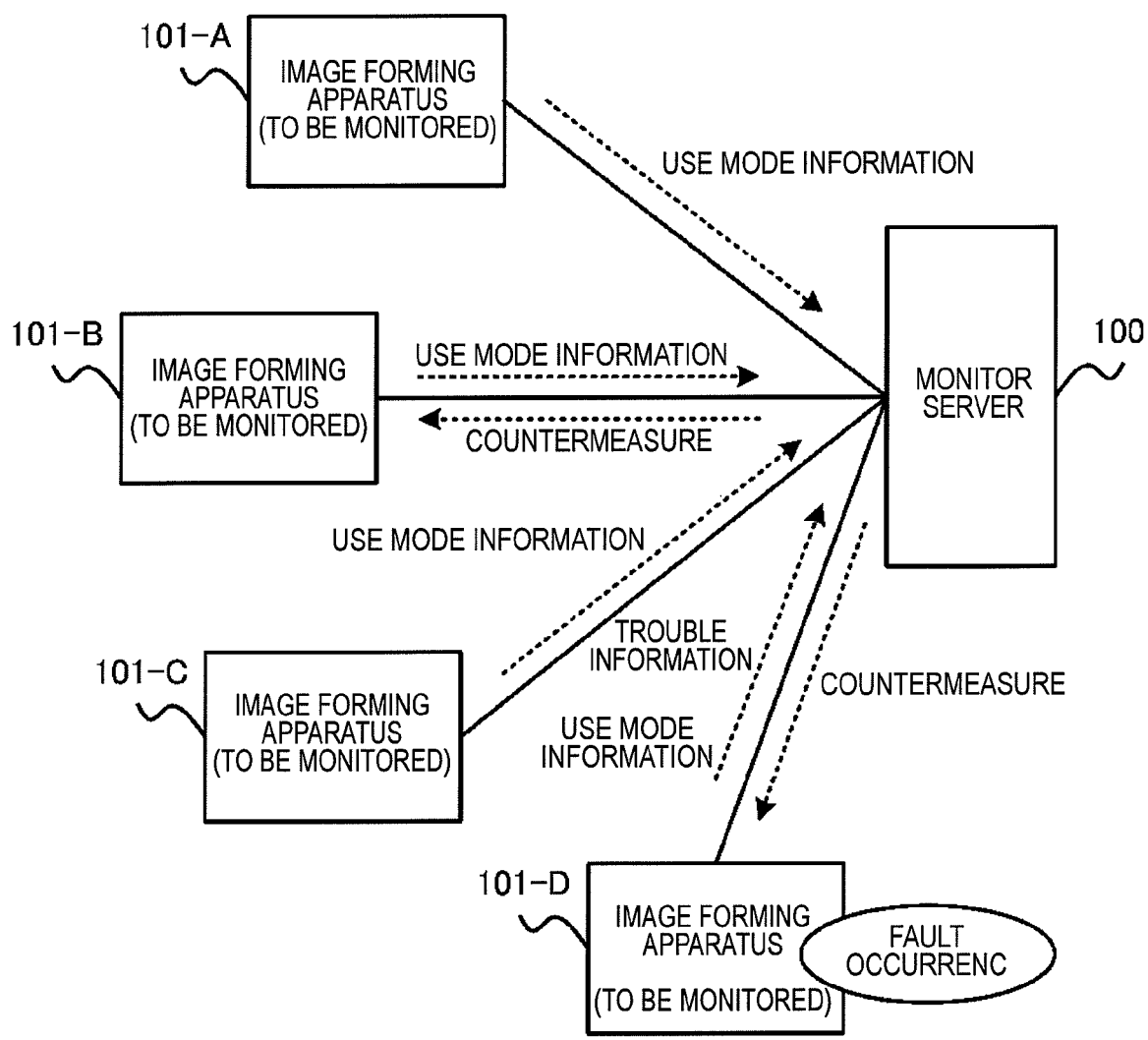
FIG. 1 is a block diagram to show the system configuration incorporating an information processing system in an exemplary embodiment of the invention.

FIG. 1 is a block diagram to show a system configuration example incorporating the information processing system in the exemplary embodiment of the invention.

FIG. 1 shows a network configuration wherein a plurality of image forming apparatus (101-A, 101-B, 101-C, 101-D, . . . ) (which will be hereinafter collectively called "image forming apparatus 101") and a monitor server 100 are connected through a telecommunication line.

The monitor server 100 monitors the operating state and the use state of the image forming function in the image forming apparatus 101 by timely receiving use mode information indicating how the image forming apparatus 101 has been used from the image forming apparatus 101.

The image forming apparatus 101 is an example of a processing apparatus monitored by the monitor server 100 and performs image forming processing of image data. The processing apparatus to be monitored by the monitor server 100 is not limited to the image forming apparatus 101 and may be any other processing apparatus (for example, a network device, etc.,).

In the image forming apparatus 101, use mode information is created by performing image forming processing, etc., and then is updated each time image forming processing is performed, etc. For example, if print processing is performed as an example of image forming processing, use mode information made up of various set items of the rotation speed of a sheet conveying roller, the start of a print function, etc., and the setup values of the set items and is created. The use mode information may contain information indicating how the image forming apparatus 101 is used (use state) such as information concerning the number of color print sheets and the sheet size used for print in addition to the information concerning the setup values. In print processing, etc., the use mode information is updated as required.

The use mode information further contains identification information for identifying the image forming apparatus.

The use mode information thus created is stored in the image forming apparatus 101 and is transmitted to the monitor server 100 when the given time is reached or is transmitted to the monitor server 100 by receiving a transmission request from the monitor server 100.

Further, when a fault (or also called "defective condition") occurs in an image forming processing function, the image forming apparatus 101 creates fault information concerning the occurring fault (which will be hereinafter also called "trouble information") by a state monitor function and transmits the created trouble information to the monitor server 100 together with the use mode information.

The trouble information and the use mode information may be transmitted to the monitor server 100 based on a request of an operator of the image forming apparatus, for example, as the operator presses a button provided on the image forming apparatus. In the case based on a request of the operator, the operator is allowed to enter information concerning the fault type through the image forming apparatus, and the entered information concerning the fault type is transmitted to the monitor server 100 as trouble information (or added to trouble information).

The monitor server 100 receives the use mode information in each image forming apparatus from the image forming apparatus 101 connected through a telecommunication line, thereby storing the use mode information in association with the image forming apparatus.

Further, upon reception of the use mode information together with the trouble information, a multiple regression analysis and linear discrimination are executed using the use mode information in the same model as the image forming apparatus where a fault occurs or any other image forming apparatus corresponding to the image forming apparatus, thereby determining a fault countermeasure method based on the trouble information.

The determined countermeasure method is fed back into the image forming apparatus where the fault occurs, thereby solving the trouble.

EXAMPLE 1

Figure 2:
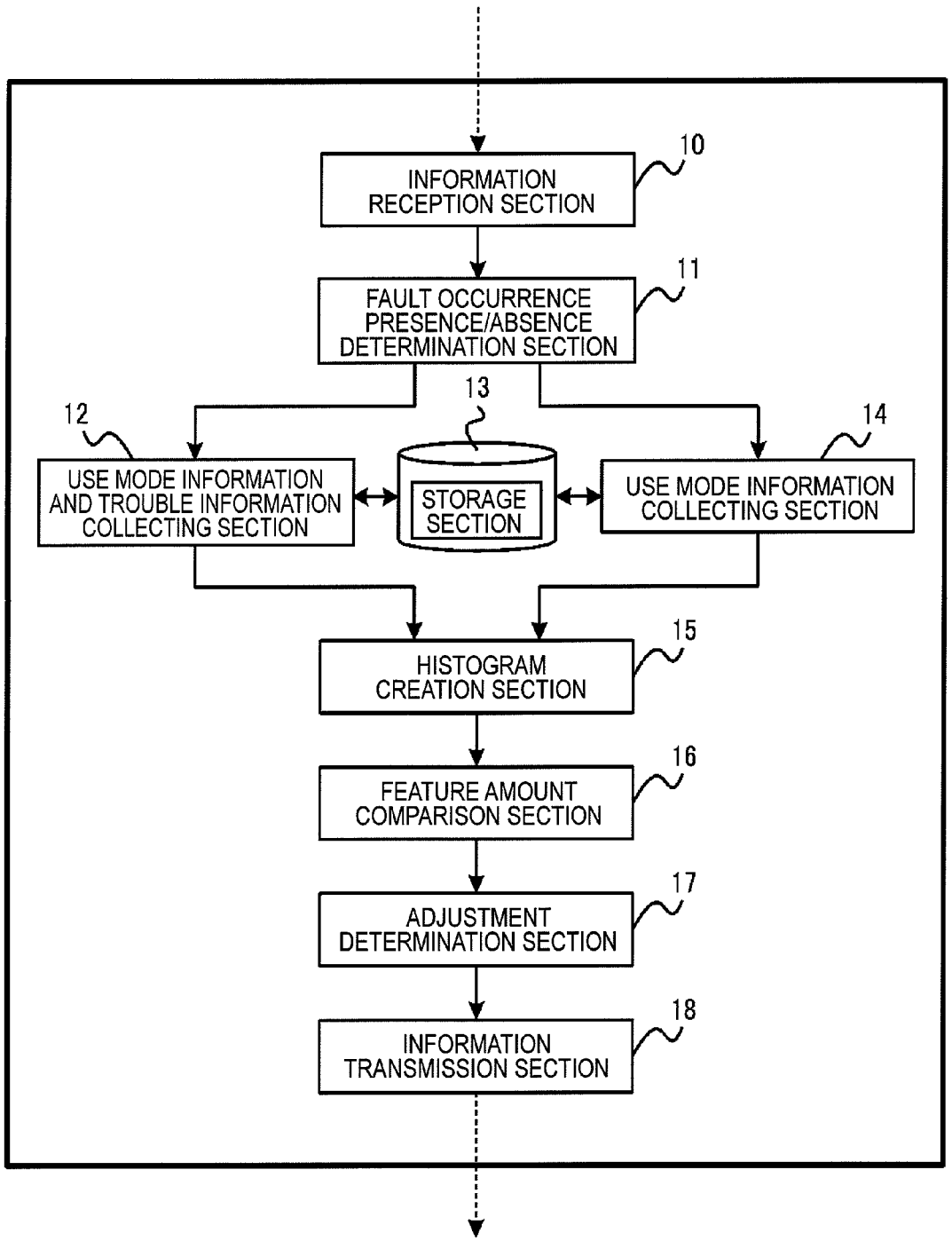
FIG. 2 is a block diagram to show an example of the detailed configuration of a monitor server in the configuration as shown in FIG. 1.

FIG. 2 is a block diagram to show an example of the detailed configuration of the monitor server as shown in FIG. 1.

In FIG. 2, the monitor server 100 is made up of an information reception section 10, a fault occurrence presence/absence determination section 11, a use mode information and trouble information collecting section 12, a storage section 13, a use mode information collecting section 14, a histogram creation section 15, a feature amount comparison section 16, an adjustment determination section 17, and an information transmission section 18.

The information reception section 10 receives use mode information, trouble information, etc., from the image forming apparatus 101. The information reception section 10 has a time count function and sends an information transmission request of the use mode information, etc., to each image forming apparatus 101 when a predetermined time is reached.

Upon reception of the use mode information, etc., from the image forming apparatus 101, the information reception section 10 sends the received use mode information, etc., to the fault occurrence presence/absence determination section 11. The fault occurrence presence/absence determination section 11 determines whether or not the received use mode information, etc., contains trouble information, thereby determining whether or not a fault occurs in the image forming apparatus transmitting the use mode information, etc. That is, if the information reception section 10 receives only the use mode information, it can be determined that a fault does not occur in the image forming apparatus transmitting the use mode information, etc.; if the information reception section 10 receives not only the use mode information, but also trouble information, it can be determined that a fault occurs in the image forming apparatus transmitting the use mode information, etc.

If it is thus determined that a fault does not occur, the use mode information is sent to the use mode information collecting section 14. In contrast, if it is determined that a fault occurs, the received use mode information and trouble information are sent to the use mode information and trouble information collecting section 12.

The use mode information collecting section 14 collects the received use mode information and stores it in the storage section 13 as the use mode information associated with identification information contained in the use mode information. The use mode information collecting section 14 acquires the use mode information in the image forming apparatus of the same model as the image forming apparatus transmitting the received use mode information from the storage section 13 and sends the use mode information to the histogram creation section 15.

Upon reception of the use mode information and the trouble information from the fault occurrence presence/absence determination section 11, the use mode information and trouble information collecting section 12 stores the use mode information and the trouble information in the storage section 13 in association with the image forming apparatus 101 transmitting the information. The use mode information and trouble information collecting section 12 acquires the use mode information in the image forming apparatus where the fault indicated by the trouble information occurring in the image forming apparatus of the same model as the image forming apparatus transmitting the received use mode information and trouble information occurs from the storage section 13 and sends the use mode information to the histogram creation section 15.

The histogram creation section 15 creates a histogram for the setup value of each set item of the use mode information.

That is, the histogram creation section 15 creates a histogram based on the use mode information of the normally operating image forming apparatus received from the use mode information collecting section 14 and a histogram based on the use mode information of the image forming apparatus where a fault occurs, received from the use mode information and trouble information collecting section 12 for each set item of the use mode information.

Figure 3A:
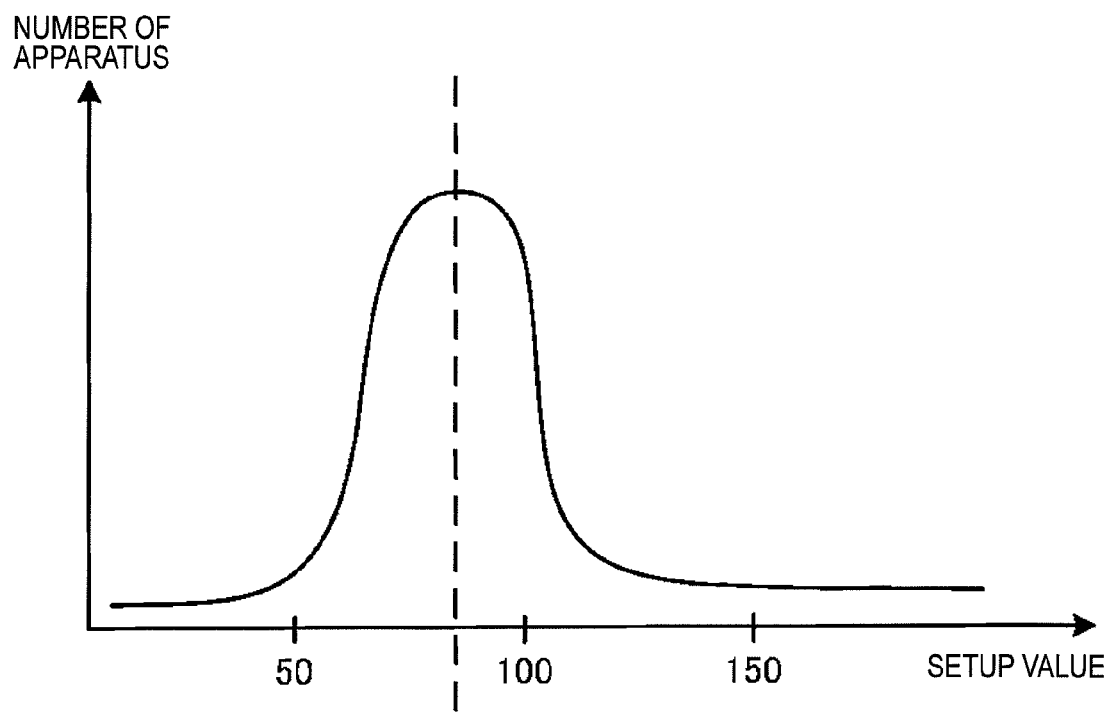
FIGS. 3A and 3B are drawings to show histograms based on use mode information of an image forming apparatus.
Figure 3B:
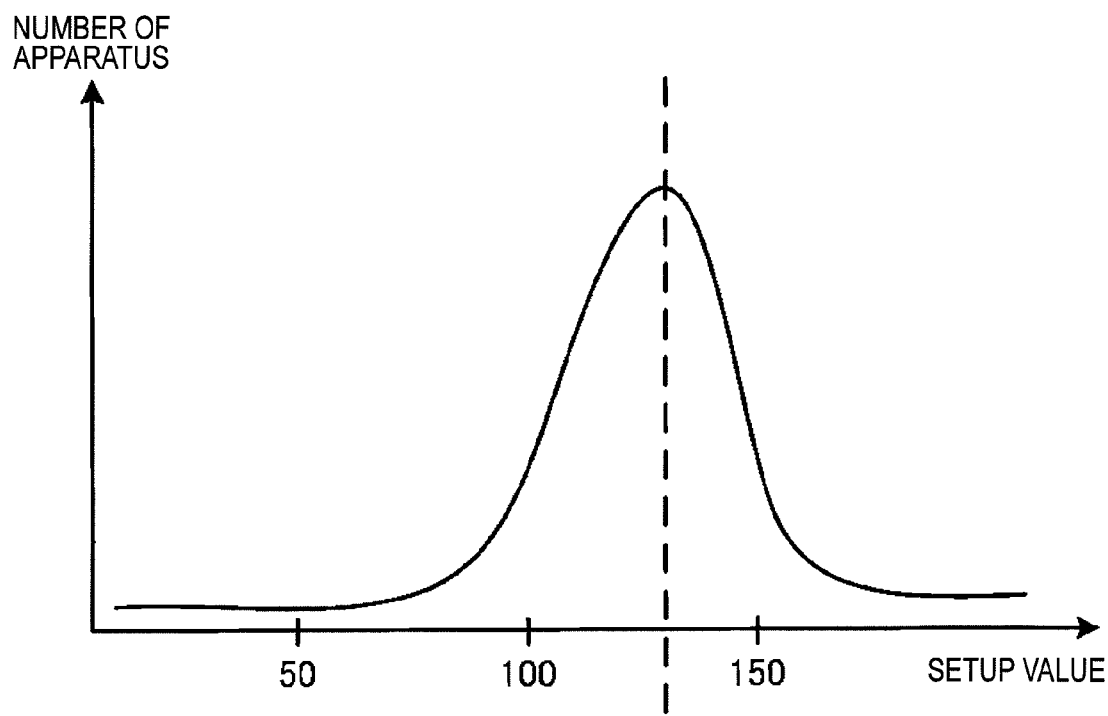

FIG. 3A shows an example of the former histogram and FIG. 3B shows an example of the latter histogram.

FIGS. 3A and 3B each shows a histogram of the setup values of the conveying time for the set item of the conveying time to a sheet detection sensor as a print sheet stored in a storage chamber is conveyed; the setup value for the conveying time is indicated on a horizontal axis and the number of image forming apparatus for which each setup value is set is indicated on a vertical axis.

Figure 5:
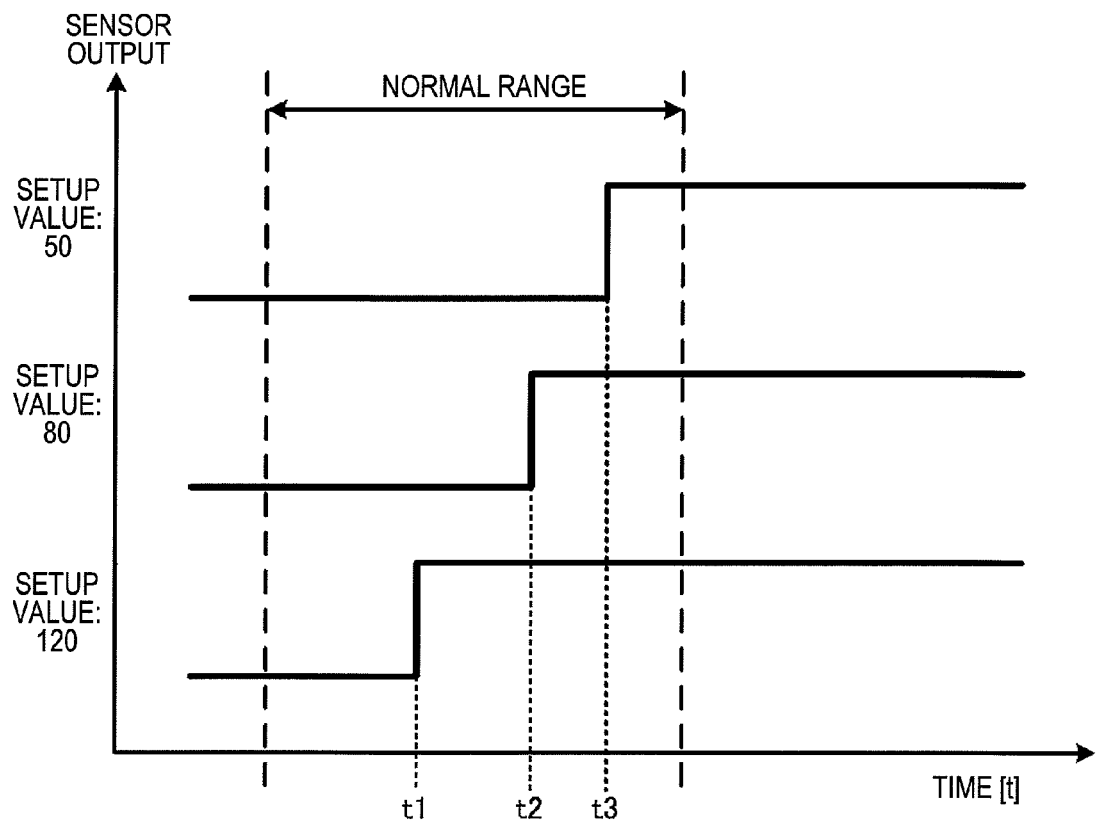
FIG. 5 is a drawing to show the time until a sensor detects a print sheet.

In FIGS. 3A and 3B, the setup values that can be set as the setup value for the conveying time (0 to 200) are indicated on the horizontal axis. FIG. 5 shows an example of the conveying time of a print sheet when each setup value is set.

Figure 4:
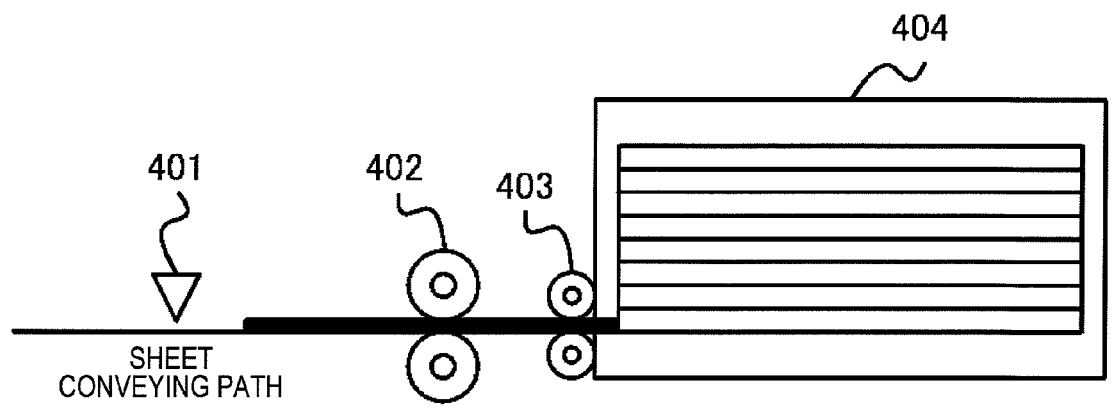
FIG. 4 is a drawing to show the print sheet conveying process of an image forming apparatus.

FIG. 4 is a drawing to show the "conveying time to a sheet detection sensor as a print sheet stored in a storage chamber is conveyed" of the setup item of the histogram shown in FIGS. 3A and 3B.

A print sheet stored in a print sheet storage chamber 404 is taken out by a sheet taking-out roller 403 and is conveyed on a sheet conveying path by a sheet conveying roller 402. At this time, the conveying time from the start of taking out by the sheet taking-out roller 403 to arrival at a sheet detection sensor 401 installed at a specific position on the sheet conveying path is set according to the setup value in FIGS. 3A and 3B.

FIG. 5 is a drawing to show the time until the sensor 401 detects a print sheet in three cases where the setup value is set to 50, 80, and 120.

FIG. 5 shows the elapsed times until the sensor 401 detects a print sheet (sensor output) in the cases where the setup value is set to 50, 80, and 120.

FIG. 5 indicates that the elapsed time until sensor output when the setup value is set to 50 is t3, indicates that the elapsed time until sensor output when the setup value is set to 80 is t2, and indicates that the elapsed time until sensor output when the setup value is set to 120 is t1.

Figure 6A:
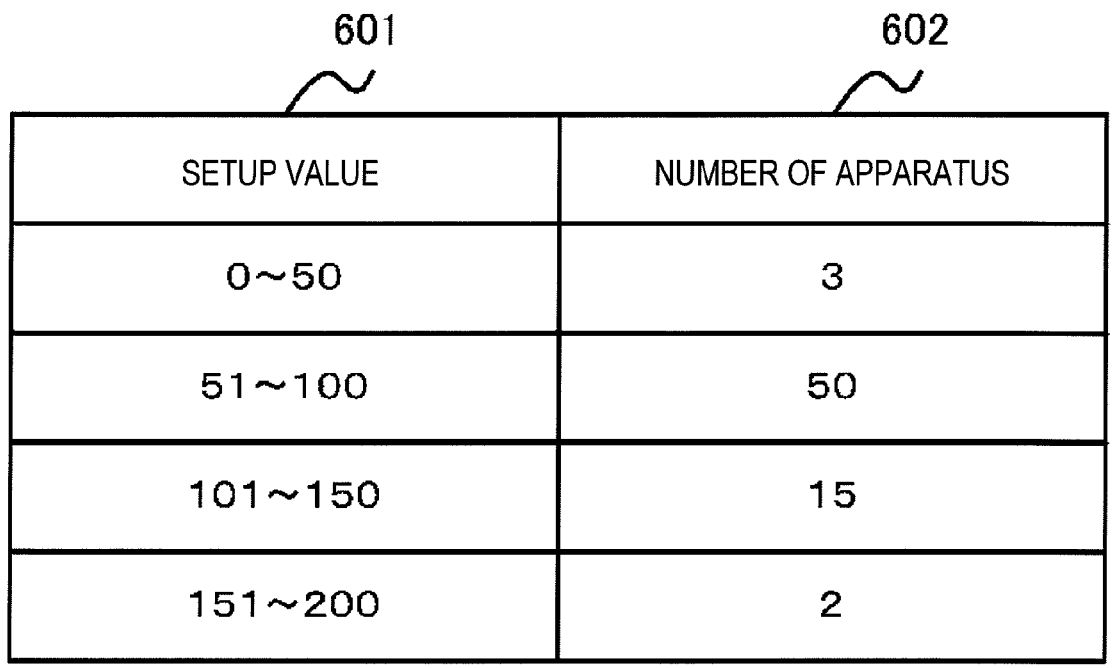
FIGS. 6A and 6B are drawings to represent the number of image forming apparatus for which each setup value in a given range in a set item is set.
Figure 6B:
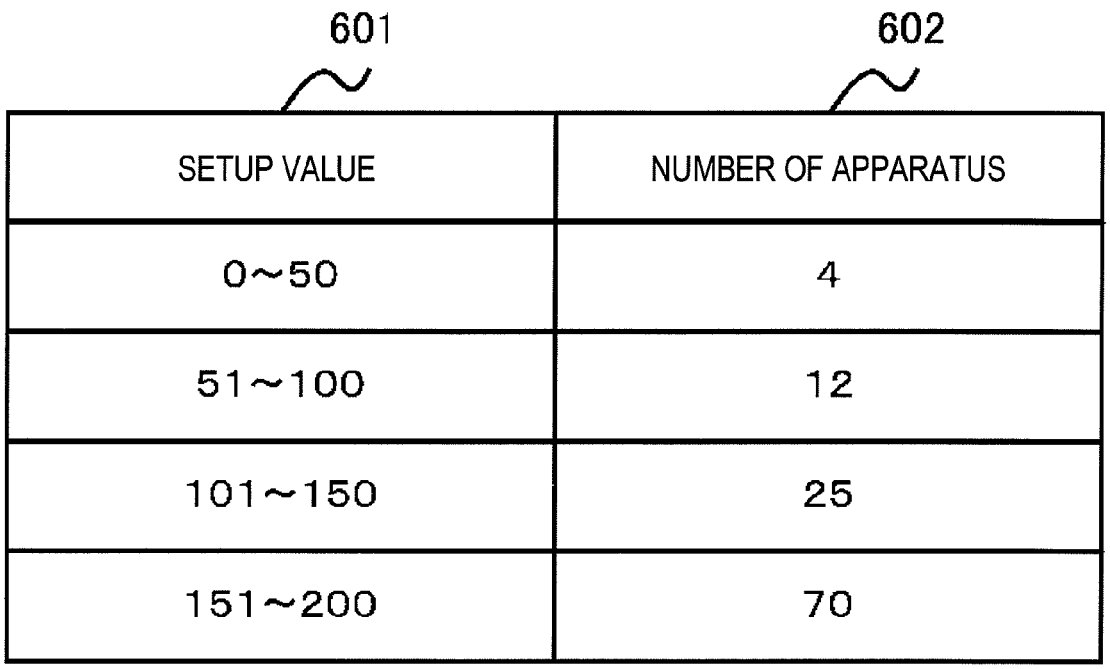

FIGS. 6A and 6B shows the number of image forming apparatus for which each setup value is set (number of apparatus indicated on the vertical axis).

FIGS. 6A and 6B are drawings to represent the number of image forming apparatus for which each setup value in a given range in a set item is set, and is made up of [setup value] item 601 and [number of apparatus] item 602.

The [setup value] item 601 indicates the setup value width and the [number of apparatus] item 602 indicates the number of image forming apparatus in the setup value width indicated under the [setup value] item 601.

FIG. 6A shows the setup values set for the normally operating image forming apparatus and the number of image forming apparatus for which the setup value is set.

For example, a record wherein the [setup value] item 601 is "0-50" and the [number of apparatus] item 602 is "3" indicates that three image forming apparatus for which the setup value 50 or less is set are installed. A record wherein the [setup value] item 601 is "51-100" and the [number of apparatus] item 602 is "50" indicates that 50 image forming apparatus for which any of the setup values 51 to 100 is set are installed. Further, a record wherein the [setup value] item 601 is "101-150" and the [number of apparatus] item 602 is "15" indicates that 15 image forming apparatus for which any of the setup values 101 to 150 is set are installed. A record wherein the [setup value] item 601 is "151-200" and the [number of apparatus] item 602 is "2" indicates that two image forming apparatus for which the setup value 151 or more is set are installed.

FIG. 6B shows the setup values set for the image forming apparatus where a fault occurs and the number of image forming apparatus for which the setup value is set.

For example, a record wherein the [setup value] item 601 is "0-50" and the [number of apparatus] item 602 is "4" indicates four image forming apparatus for which the setup value 50 or less is set are installed. A record wherein the [setup value] item 601 is "51-100" and the [number of apparatus] item 602 is "12" indicates that 12 image forming apparatus for which any of the setup values 51 to 100 is set are installed. Further, a record wherein the [setup value] item 601 is "101-150" and the [number of apparatus] item 602 is "25" indicates that 25 image forming apparatus for which any of the setup values 101 to 150 is set are installed. A record wherein the [setup value] item 601 is "151-200" and the [number of apparatus] item 602 is "70" indicates that 70 image forming apparatus for which the setup value 151 or more is set are installed.

When the histogram creation section 15 creates two histograms (a histogram in the setup values of the image forming apparatus where a fault occurs and a histogram in the same setup values of the normally operating image forming apparatus), the histogram creation section 15 sends the created histograms to the feature amount comparison section 16 and requests the feature amount comparison section 16 to make a comparison between the two histograms.

The feature amount comparison section 16 compares the feature amounts characterizing the histograms created by the histogram creation section 15 and calculates a difference between the histograms. If the difference between the calculated feature amounts is equal to or greater than a threshold value, it indicates that the tendency in setting the setup values in each set item largely differs between the normally operating image forming apparatus and the image forming apparatus where a fault occurs.

When the feature amount comparison section 16 compares the feature amounts, it sends the comparison result to the adjustment determination section 17, which then determines whether or not the setup value of the set item needs to be changed based on the comparison result. If the adjustment determination section 17 determines that the setup value needs to be changed, it calculates the average value of the whole setup values in the set item of the normally operating image forming apparatus and the center value in a given standard deviation.

When changing the setup value to the post-calculated value, the adjustment determination section 17 makes adjustment.

When adjusting the setup value in the set item, the adjustment determination section 17 sends the setup value to the information transmission section 18. The information transmission section 18 transmits the adjusted setup value to the image forming apparatus where a fault occurs, whereby the setup value is applied for taking countermeasures against the fault.

Such setup value adjustment is made for each set item.

Figure 7:
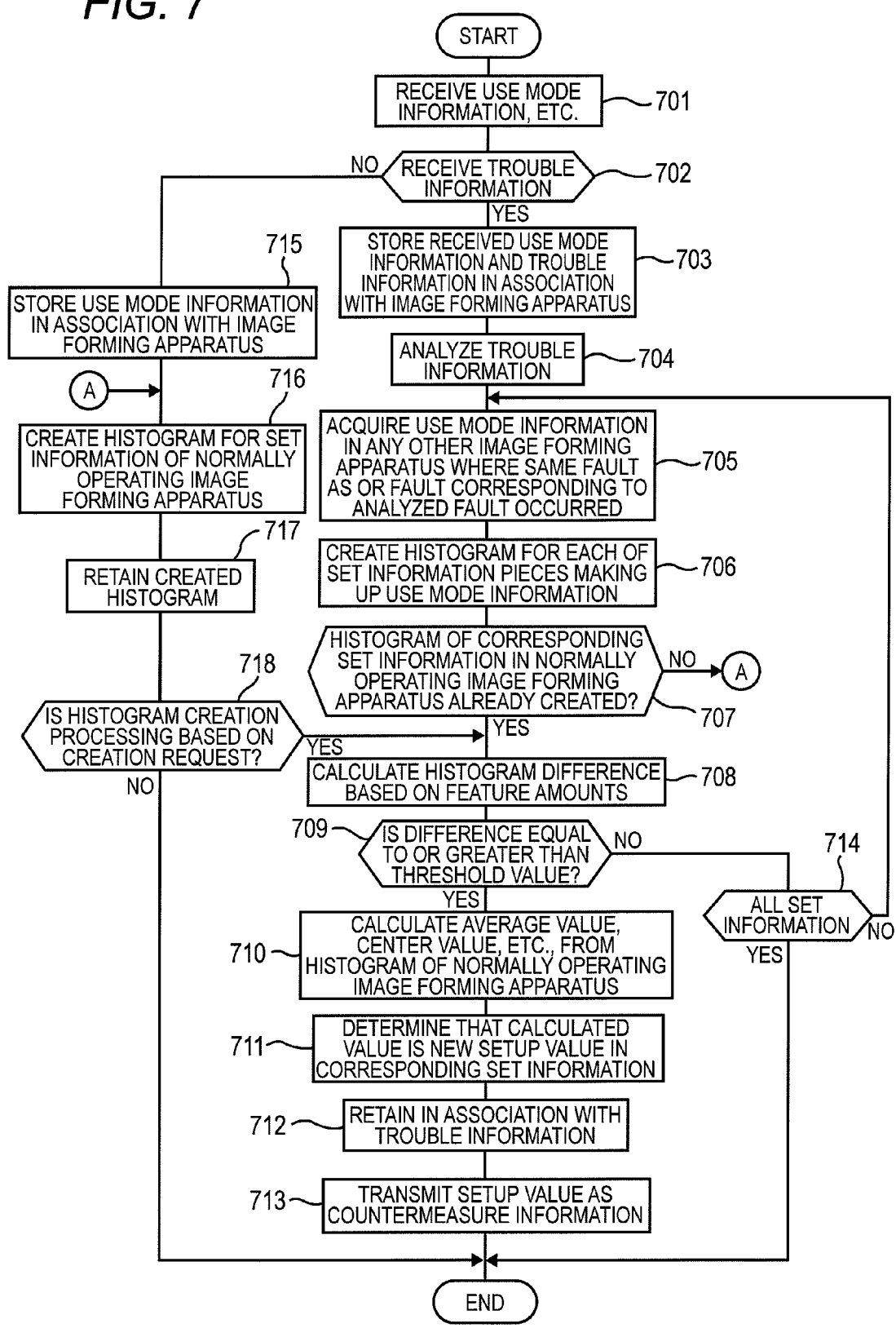
FIG. 7 is a flowchart to show a detailed flow of processing performed in the monitor server forming a part of the information processing system in the exemplary embodiment of the invention.

FIG. 7 is a flowchart to show a detailed flow of processing performed in the monitor server forming a part of the information processing system in the exemplary embodiment of the invention.

Upon reception of use mode information, etc., from an image forming apparatus (701), whether or not the received information contains trouble information indicating the description of a fault occurring in the image forming apparatus transmitting the information is determined (702).

If the use mode information is received without receiving trouble information (NO at 702), it indicates that the use mode information is transmitted on a regular basis as a predetermined time is reached (not because a fault occurs in the image forming apparatus transmitting the information), and the received use mode information is stored in association with identification information for identifying the image forming apparatus (715).

Subsequently, based on the use mode information received from other normally operating image forming apparatus and stored, a histogram is created for each of various set items contained in the use mode information (716).

That is, as many histograms as the number of set items contained in the use mode information are created; as one example, FIG. 3A shows a histogram in the set item of the elapsed time of taking out a print sheet.

The histogram thus created is retained as a histogram in the corresponding set item of the normally operating image forming apparatus (717).

Further, whether or not the creation processing of the histogram is based on a creation request of a histogram used for countermeasures because of occurrence of a fault is determined (718). If the creation processing of the histogram is not based on a creation request (NO at 718), the processing is terminated.

Next, if trouble information as well as the use mode information is received from the image forming apparatus (YES at 702), it indicates that the use mode information and the trouble information are received because a fault occurs in the image forming apparatus transmitting the information, and the received use mode information and trouble information are stored in association with identification information of the image forming apparatus transmitting the information (703).

Subsequently, the received trouble information is analyzed, thereby determining the description of the fault occurring in the image forming apparatus (704).

The use mode information in any other image forming apparatus where the same fault as or the fault corresponding to the analyzed and determined fault description occurred is acquired (705). A histogram is created for each of various set items contained in the acquired use mode information (706).

Subsequently, whether or not a histogram of the normally operating image forming apparatus in the corresponding set item is retained for the created histogram of each set item is determined (707). If the histogram is created and is retained (YES at 707), the difference between the feature amounts of both histograms is calculated (708).

In contrast, if the histogram of the normally operating image forming apparatus in the corresponding set item is not retained (NO at 707), a histogram for the set item of the normally operating image forming apparatus is created (716) and the created histogram is retained (717). If the creation processing of the histogram is based on a creation request of a histogram used for countermeasures because of occurrence of a fault (YES at 718), the difference from the histogram based on the use mode information of the image forming apparatus where the fault occurs is calculated (708).

When the histogram difference is thus calculated, whether or not the difference is equal to or greater than a threshold value is determined (709). If the difference is less than the threshold value (NO at 709), it indicates that there is no large difference in the setup value of the corresponding set item between the normally operating image forming apparatus and the image forming apparatus where the fault occurs.

In this case, subsequently, whether or not the difference has been calculated and has been compared for the feature amounts of the histograms for all set items is determined (714) and if the difference has been compared for all set items (YES at 714), the processing is terminated.

If the difference is not compared for all set items (NO at 714), processing at step 705 and the later steps is repeated for any other set item.

As a result of calculating the histogram difference, if it is determined that the difference is equal to or greater than the threshold value (YES at 709), it indicates that a large difference occurs in the setup value of the corresponding set item between the normally operating image forming apparatus and the image forming apparatus where the fault occurs.

In this case, the average value of the whole setup values in the set item of the normally operating image forming apparatus and the center value in a given standard deviation are calculated (710). The calculated value is determined a new setup value in the set item (711).

When the new setup value is thus determined, information of the setup value for the set item is retained in association with the received trouble information (712) and is transmitted to the image forming apparatus transmitting the trouble information as countermeasures against the fault (713).

EXAMPLE 2

In Example 1 described above, it is made possible to take countermeasures for the image forming apparatus where a fault occurs; while, in Example 2, countermeasures are also taken for an image forming apparatus where a fault does not occur.

Figure 8:
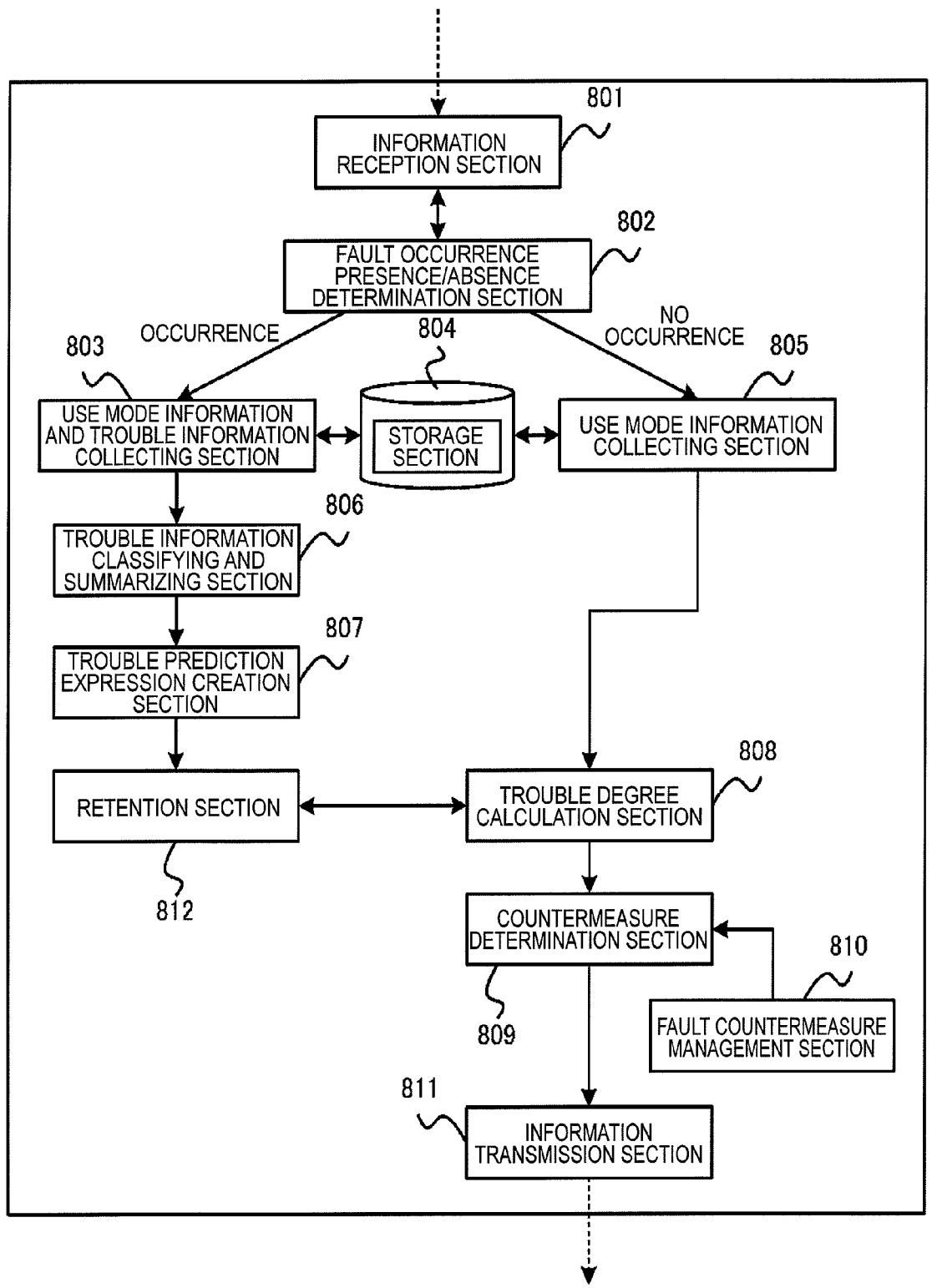
FIG. 8 is a block diagram to show an example of the detailed configuration of a monitor server in the configuration as shown in FIG. 1.

FIG. 8 is a block diagram to show an example of the detailed configuration of a monitor server in the configuration as shown in FIG. 1;

In FIG. 8, a monitor server 100 is made up of an information reception section 801, a fault occurrence presence/absence determination section 802, a use mode information and trouble information collecting section 803, a storage section 804, a use mode information collecting section 805, a trouble information classifying and summarizing section 806, a trouble prediction expression creation section 807, a trouble degree calculation section 808, a countermeasure determination section 809, a fault countermeasure management section 810, an information transmission section 811, and a retention section 812.

The information reception section 801 receives use mode information, trouble information, etc., from an image forming apparatus 101. The information reception section 801 has a time count function and sends an information transmission request of the use mode information, etc., to each image forming apparatus 101 when a predetermined time is reached.

Upon reception of the use mode information, etc., from the image forming apparatus 101, the information reception section 801 sends the received use mode information, etc., to the fault occurrence presence/absence determination section 802. The fault occurrence presence/absence determination section 802 determines whether or not the received use mode information, etc., contains trouble information, thereby determining whether or not a fault occurs in the image forming apparatus transmitting the use mode information, etc. That is, if the information reception section 801 receives only the use mode information, it is determined that a fault does not occur; if the information reception section 801 receives not only the use mode information, but also trouble information, it is determined that a fault occurs in the image forming apparatus transmitting the use mode information, etc.

If it is determined that a fault does not occur, the use mode information is sent to the use mode information collecting section 805. In contrast, if it is determined that a fault occurs, the received use mode information and trouble information are sent to the use mode information and trouble information collecting section 803.

The use mode information collecting section 805 collects the received use mode information and stores it in the storage section 804 as the use mode information associated with identification information contained in the use mode information. The use mode information collecting section 805 acquires the use mode information in the image forming apparatus of the same model as the image forming apparatus transmitting the received use mode information from the storage section 804 and sends the use mode information to the trouble degree calculation section 808.

Upon reception of the use mode information and the trouble information from the fault occurrence presence/absence determination section 802, the use mode information and trouble information collecting section 803 stores the use mode information and the trouble information in the storage section 804 in association with the image forming apparatus 101 transmitting the information. The use mode information and trouble information collecting section 803 acquires the use mode information and the trouble information in the image forming apparatus of the same model as the image forming apparatus transmitting the received use mode information and trouble information from the storage section 804 and sends the use mode information and the trouble information to the trouble information classifying and summarizing section 806.

FIG. 9 shows an example of the use mode information and the trouble information for the identification information of the image forming apparatus stored in the storage section 804 by performing the processing described above.

FIG. 9 is made up of an "apparatus ID" item 901, a "trouble information" item 902, a "production date" item 903, a "number of color sheets" item 904, a "number of monochrome sheets" item 905, and a "number of drum cycles" item 906; it contains the use mode information of the normally operating image forming apparatus collected in the use mode information collecting section 805 in addition to the use mode information and the trouble information of the image forming apparatus where a fault occurred, collected in the use mode information and trouble information collecting section 803.

For example, a record wherein the "apparatus ID" item 901 is "1114741," the "trouble information" item 902 is "AAA," the "production date" item 903 is "Mar. 3, 2008," the "number of color sheets" item 904 is "152," the "number of monochrome sheets" item 905 is "10221," and the "number of drum cycles" item 906 is "20584" indicates that a fault of AAA occurred in the image forming apparatus having the apparatus ID "1114741," that the production date of the image forming apparatus is "Mar. 8, 2008," and that the number of revolutions of the drum is "20584" as the image forming apparatus has performed color print of "152" sheets and has performed monochrome print of "10221" sheets.

A record wherein the "apparatus ID" item 901 is "M/C-1," the "trouble information" item 902 is "-," the "production date" item 903 is "May 1, 2008, the "number of color sheets" item 904 is "125," the "number of monochrome sheets" item 905 is "7654," and the "number of drum cycles" item 906 is "13658" indicates that the image forming apparatus having the apparatus ID "M/C-1" normally operates because the "trouble information" item 902 is "-," that the production date of the image forming apparatus is May 1, 2008," and that the number of revolutions of the drum is "13658" as the image forming apparatus has performed color print of "125" sheets and has performed monochrome print of "7654" sheets.

Upon reception of the use mode information and the trouble information as shown in FIG. 9 from the use mode information and trouble information collecting section 803, the trouble information classifying and summarizing section 806 classifies and summarizes the use mode information and the trouble information into the use mode information of the image forming apparatus in each piece of trouble information and the use mode information of the normally operating image forming apparatus.

FIG. 10 shows the use mode information of the image forming apparatus in trouble information "AAA" and the use mode information of the normally operating image forming apparatus.

FIG. 10 is a drawing provided by summarizing information used to create a fault prediction expression (which will be hereinafter referred to as "trouble prediction expression") by the trouble prediction expression creation section 807 from the table shown in FIG. 9.

FIG. 10 is made up of a "trouble information" item 1001, an "apparatus ID" item 1002, a "number of monochrome sheets (X)" item 1003, and a "number of drum cycles (Y)" item 1004.

As an example, "AAA" is shown as trouble information in the "trouble information" item 1001, the apparatus ID of the apparatus where a fault occurred is shown in the "apparatus ID" item 1002, the number of monochrome print sheets is shown in the "number of monochrome sheets (X)" item 1003, and the number of revolutions of the drum is shown in the "number of drum cycles (Y)" item 1004. At this time, the number of monochrome print sheets is a variable X and the number of revolutions of the drum is a variable Y.

Further, as another example, "-" is shown in the "trouble information" item 1001, "M/C-1" is shown as the apparatus ID of the normally operating image forming apparatus in the "apparatus ID" item 1002, "7654" is shown as the number of monochrome print sheets in the "number of monochrome sheets (X)" item 1003, and "13658" is shown as the number of revolutions of the drum in the "number of drum cycles (Y)" item 1004.

When the trouble information classifying and summarizing section 806 classifies and summarizes the use mode information and the trouble information into the use mode information of the image forming apparatus in each piece of trouble information and the use mode information of the normally operating image forming apparatus as shown in FIG. 10, the trouble information classifying and summarizing section 806 sends the result to the trouble prediction expression creation section 807.

The trouble prediction expression creation section 807 creates a trouble prediction expression based on the information as shown in FIG. 10 provided by the trouble information classifying and summarizing section 806.

The trouble prediction expression can be found as a linear discriminant function as shown in the following (expression 1):

[Expression 1]

$$Z=aX+bY+c \quad \text{(Expression 1)}$$

A variable Z in (expression 1) indicates the trouble degree. If the variable Z is a value greater than 0 (zero), it is determined that there is a possibility that a fault may occur. If the variable Z is equal to or less than 0 (zero), it is determined that the possibility that the apparatus will normally operate is high.

Variables X and Y are arguments used for trouble prediction. In the example shown in FIG. 10, the number of monochrome print sheets is the variable X and the number of color print sheets is the variable Y.

Thus, if the variable Z is a value greater than 0 (zero), it indicates that there is a possibility that "AAA" may occur as a fault.

Constants a and b shown in (expression 1) are calculated according to the following simultaneous equations (expressions 2 and 3):

[Expression 2]

$$F = \frac{n_N\{a(\ddot{x}_N - \ddot{x}) + b(\ddot{y}_N - \ddot{y})\} + n_T\{a(\ddot{x}_T - \ddot{x}) + b(\ddot{y}_T - \ddot{y})\}}{(n-1)\{a^2 s_x^2 + 2abs_{xy} + b^2 s_y^2\}} \quad \text{(Expression 2)}$$

[Expression 3]

$$\frac{\partial F}{\partial a} = 0, \frac{\partial F}{\partial b} = 0 \quad \text{(Expression 3)}$$

A subscript T of the variable shown in (expression 2) indicates the group of the use mode information in the image forming apparatus where trouble occurred shown in FIG. 10, and N indicates the group of the use mode information in the normally operating image forming apparatus shown in FIG. 10.

A variable $n_N$ indicates the number of case examples of normal operation shown in FIG. 10 and $n_T$ indicates the number of case examples of occurrence of trouble shown in FIG. 10.

$X_T$ indicates an average value of the numbers of monochrome print sheets in the image forming apparatus where a fault occurred, and $Y_T$ indicates an average value of the numbers of revolutions of the drums in the image forming apparatus where a fault occurred. Likewise, $X_N$ indicates an average value of the numbers of monochrome print sheets in the normally operating image forming apparatus, and $Y_N$ indicates an average value of the numbers of revolutions of the drums in the normally operating image forming apparatus.

Further, S indicates variance, $S_X$ indicates variance of the number of monochrome print sheets, $S_Y$ indicates variance of the number of revolutions of the drum, and $S_{XY}$ indicates covariance of the number of monochrome print sheets and the number of revolutions of the drum.

Next, the numeric values shown in FIG. 10 are assigned to the following (expression 4) to calculate the variables X and Y:

[Expression 4]

$$X = \frac{X_N + X_T}{2}, Y = \frac{Y_N + Y_T}{2} \quad \text{(Expression 4)}$$

When the variables X and Y are thus calculated, the variables X and Y and the constants a and b calculated according to the simultaneous equations (expressions 2 and 3) described above are assigned to (expression 1), whereby the trouble degree (variable Z) is calculated and trouble is predicted.

The trouble prediction expression described above indicates an example of prediction expression in the trouble information "AAA." A trouble prediction expression is also created for any other trouble information, for example, trouble information "BBB," etc., in a similar manner.

When thus creating the trouble prediction expression for each piece of trouble information, the trouble prediction expression creation section 807 retains the trouble prediction expressions in the retention section 812.

The trouble prediction expression is retained in the retention section 812 for each piece of trouble information.

Next, the trouble degree calculation section 808, to which the use mode information acquired from the storage section 804 is sent from the use mode information collecting section 805, calculates the trouble degree according to (expression 1). That is, the trouble degree calculation section 808 executes trouble prediction for each piece of trouble information using each trouble prediction expression retained in the retention section 812.

The trouble degree calculation section 808 transmits the prediction result to the countermeasure determination section 809, which then determines whether or not there is trouble information with the variable Z in (expression 1) becoming greater than 0 (zero). If there is trouble information with the variable Z becoming greater than 0 (zero), the countermeasure determination section 809 acquires the countermeasure description corresponding to the trouble information from the fault countermeasure management section 810 and creates trouble countermeasure information.

The trouble countermeasure information contains one or more countermeasure descriptions.

FIG. 11 shows an example of the descriptions of the trouble countermeasure information.

FIG. 11 is made up of a "trouble information" item 1101 and a "trouble countermeasure description" item 1102 and shows the countermeasure descriptions corresponding to the trouble information.

For example, if the "trouble information" item 1101 is "AAA," a countermeasure of "setting setup value X to α" shown in the "trouble countermeasure description" item 1102 is taken as the countermeasure description.

When creating the trouble countermeasure information, the countermeasure determination section 809 sends the trouble countermeasure information to the information transmission section 811, which then transmits the trouble countermeasure information to the corresponding image forming apparatus.

As the trouble countermeasure information, information of the setup values, etc., found based on the use mode information in the normally operating image forming apparatus as shown in Example 1 rather than the information acquired from the fault countermeasure management section 810 may be used.

Figure 12:
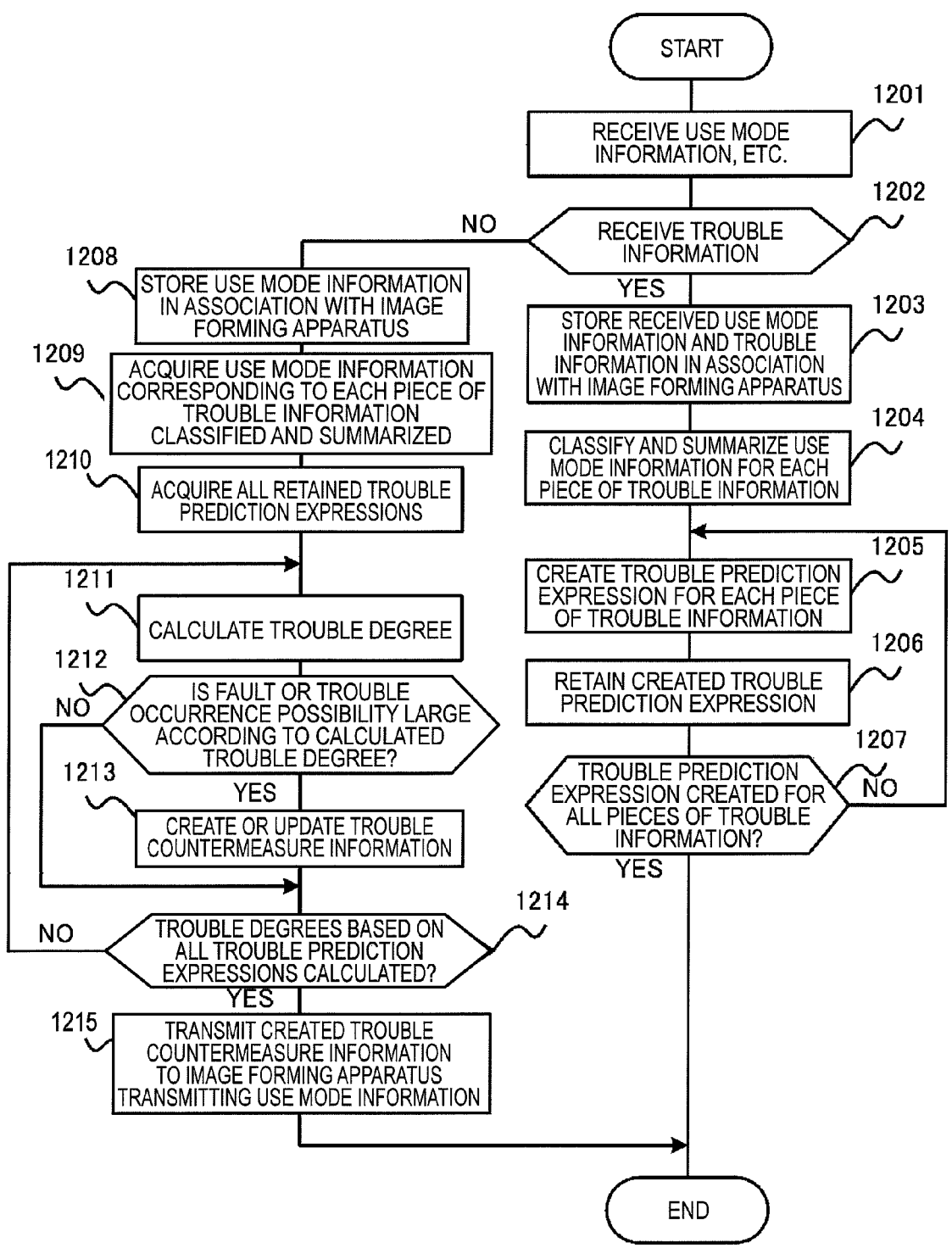
FIG. 12 is a flowchart to show a detailed flow of processing performed in the monitor server forming a part of the information processing system in the exemplary embodiment of the invention.

FIG. 12 is a flowchart to show a detailed flow of processing performed in the monitor server forming a part of the information processing system in the exemplary embodiment of the invention.

In FIG. 12, upon reception of use mode information, etc., from an image forming apparatus (1201), whether or not the received information contains trouble information indicating the description of a fault occurring in the image forming apparatus transmitting the information is determined (1202).

First, if trouble information is received (YES at 1202), the received use mode information and trouble information are stored in association with identification information for identifying the image forming apparatus (1203). That is, the use mode information and the trouble information are stored for the identification information Subsequently, the use mode information with which the same trouble information as or the trouble information corresponding to the received trouble information is associated is classified and summarized (1204) and a trouble prediction expression for each piece of trouble information is created (1205). The created trouble prediction expression is retained in association with the trouble information (1206).

Whether or not the trouble prediction expression has been created for all pieces of trouble information is determined (1207). If the trouble prediction expression has been created for all pieces of trouble information (YES at 1207), the processing is completed. If the trouble prediction expression is not created for all pieces of trouble information (NO at 1207), a trouble prediction expression is created for any other piece of trouble information (1205) and the created trouble prediction expression is retained (1206). A trouble prediction expression considering the received trouble information is created.

Next, if no trouble information is received and use mode information is received from the image forming apparatus (NO at 1202), the use mode information is stored in association with the identification information of the image forming apparatus transmitting the use mode information (1208).

Subsequently, the use mode information corresponding to the trouble information classified and summarized in the process of creating the trouble prediction expression is acquired (1209) and further all retained trouble prediction expressions are acquired (1210).

Based on the acquired use mode information, the trouble prediction expression is applied and the trouble degree is calculated (1211). Whether or not the calculated trouble degree is determined a large fault occurrence possibility is determined (1212). If it is determined that the trouble degree is determined a large occurrence possibility (YES at 1212), trouble countermeasure information based on the countermeasure description against the trouble determined a large occurrence possibility is created or updated (1213).

Next, whether or not the trouble degrees based on all trouble prediction expressions have been calculated is determined (1214). If the trouble degrees based on all trouble prediction expressions are not calculated (NO at 1214), processing on and after the step of calculating the trouble degree based on any other trouble prediction expression (1211) is repeated.

In contrast, when the trouble degrees based on all trouble prediction expressions have been calculated (YES at 1214), the created trouble countermeasure information is transmitted to the image forming apparatus transmitting the use mode information (1215).

EXAMPLE 3

Figure 13:
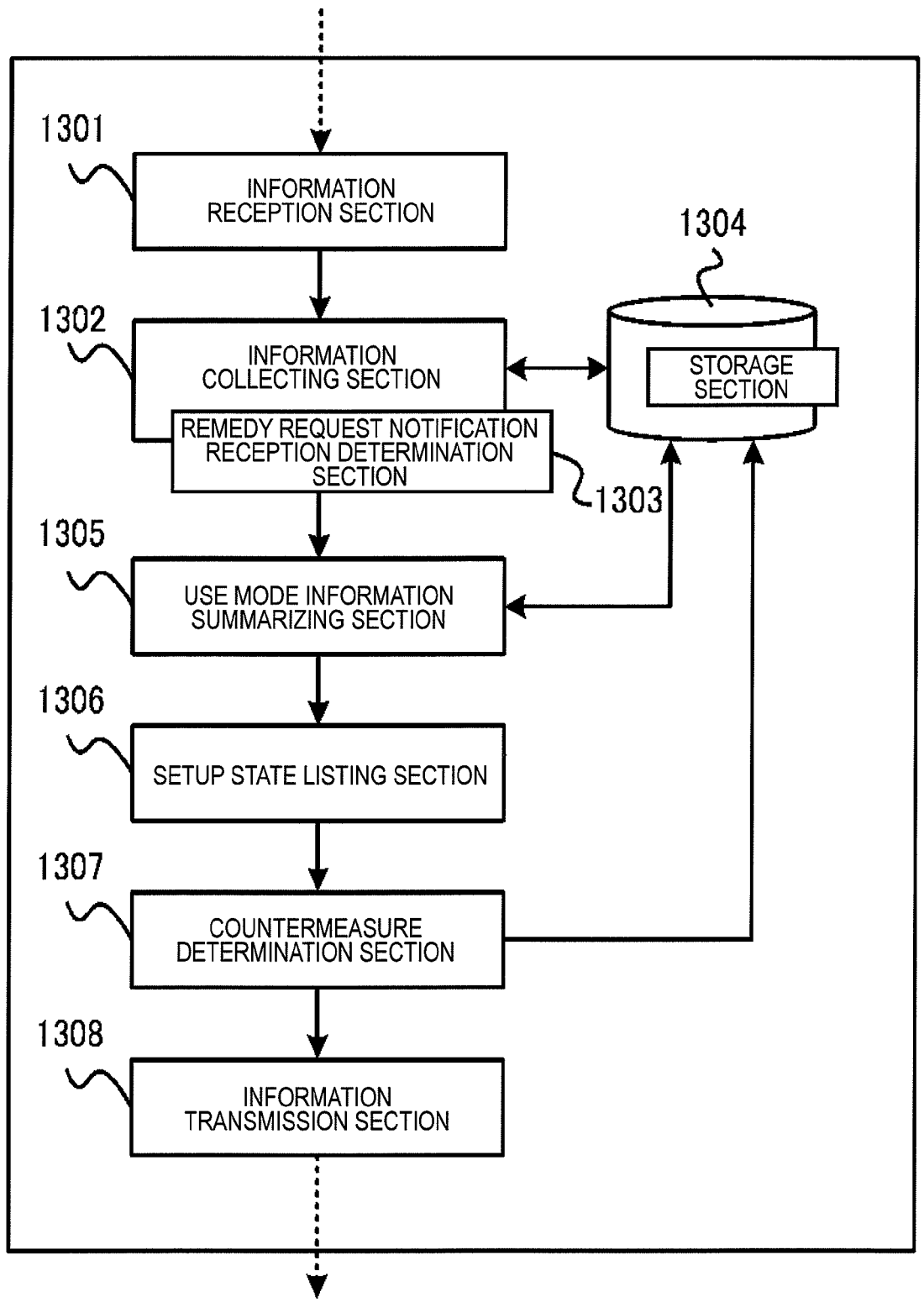
FIG. 13 is a block diagram to show an example of the detailed configuration of a monitor server in the configuration as shown in FIG. 1.

FIG. 13 is a block diagram to show an example of the detailed configuration of a monitor server in the configuration as shown in FIG. 1.

A monitor server 100 shown in FIG. 13 is made up of an information reception section 1301, an information collecting section 1302, a remedy request notification reception determination section 1303, a storage section 1304, a use mode information summarizing section 1305, a setup state listing section 1306, a countermeasure determination section 1307, and an information transmission section 1308.

The information reception section 1301 receives use mode information, etc., from an image forming apparatus 101. The information reception section 1301 receives use mode information, etc., at any desired timing in addition to reception of use mode information, etc., on a regular basis from the image forming apparatus.

The received use mode information, etc., is sent from the information reception section 1301 to the information collecting section 1302, which then stores the received use mode information and trouble occurrence rate in the storage section 1304 in association with the identification information of the image forming apparatus transmitting the use mode information, etc. In the information collecting section 1302, the installed remedy request notification reception determination section 1303 determines whether or not the information received in the information reception section 1301 contains a notification of a remedy request (an example of trouble information) made based on a reason of an operation malfunction, a decrease in the processing speed, etc., in the image forming apparatus.

As an operator, etc., of the image forming apparatus presses a button provided on the image forming apparatus, etc., the remedy request is used to send a notification of an operation malfunction, a decrease in the processing speed, etc., in the image forming apparatus.

If the remedy request notification reception determination section 1303 determines that the received information contains a remedy request, the remedy request notification reception determination section 1303 sends a request for summarizing the use mode information to the use mode information summarizing section 1305.

The use mode information summarizing section 1305 acquires use mode information in any other image forming apparatus wherein the trouble occurrence rate concerning the fault occurring in the image forming apparatus making the remedy request is equal to or less than a threshold value (namely, normally operating image forming apparatus) from the storage section 1304. Of the acquired use mode information, the same use mode information as or the use mode information corresponding to the use mode information of the image forming apparatus making the remedy request is summarized.

The use mode information summarizing section 1305 summarizes the same use mode information as or the use mode information corresponding to the use mode information in any mode information forming a part of the use mode information, for example, the number of color print sheets, etc. At this time, the use mode information summarizing section 1305 summarizes the same or corresponding use mode information by comparing one or more pieces of specified mode information.

Figure 14A:
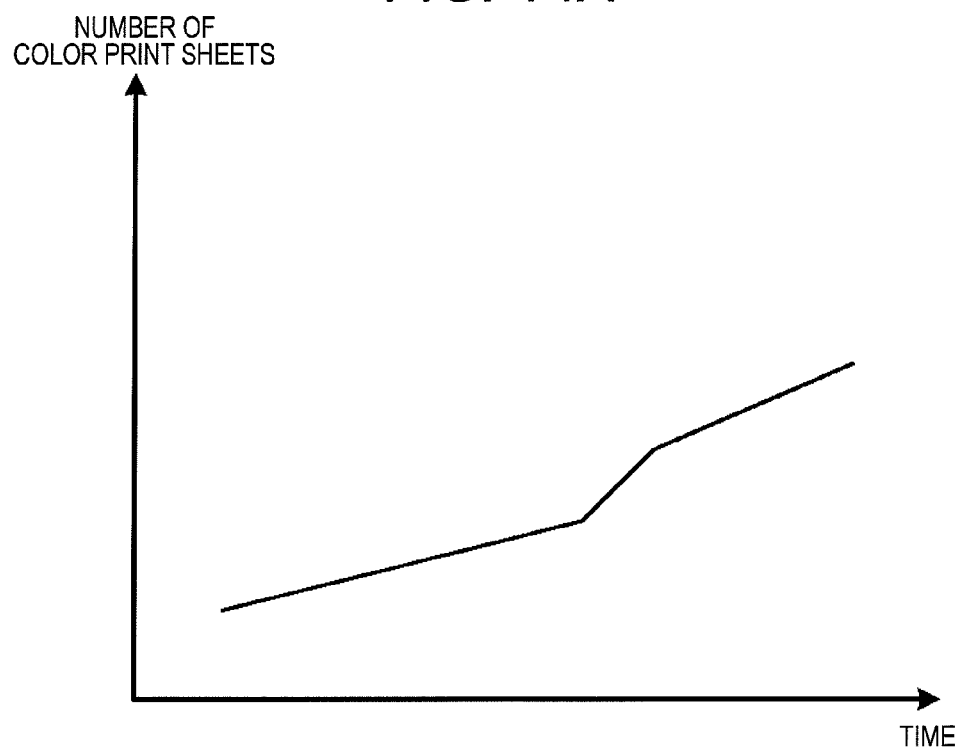
FIGS. 14A and 14B are drawings to represent the use mode of the number of color print sheets forming a part of use mode information.
Figure 14B:
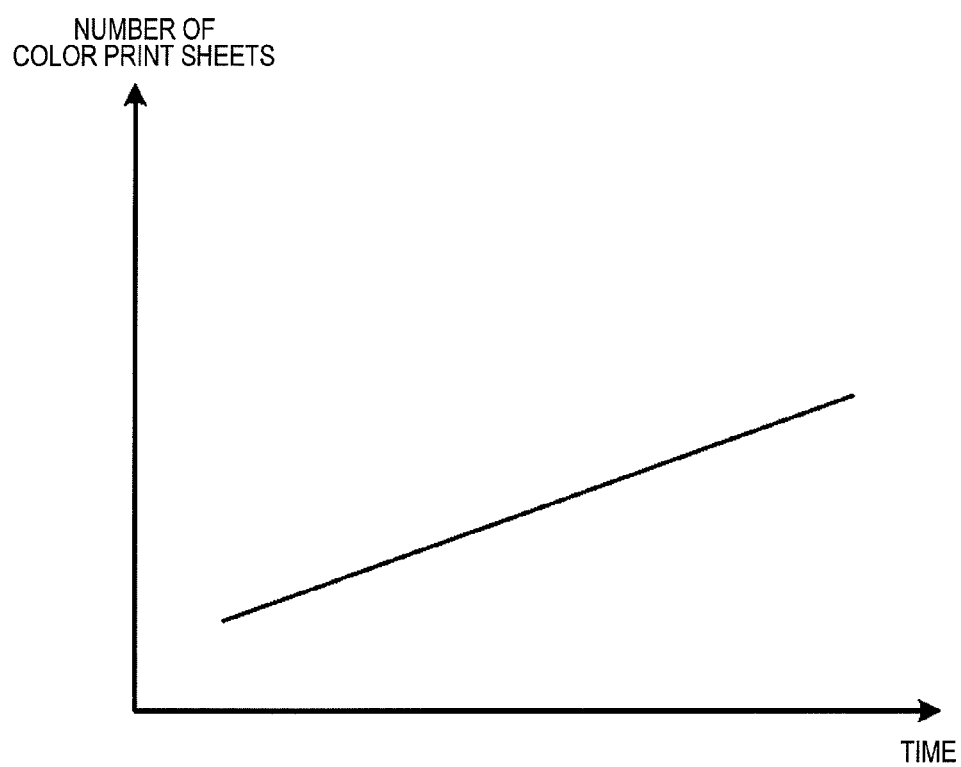

FIGS. 14A and 14B are drawings to represent the use mode of the number of color print sheets forming a part of the use mode information. FIG. 14A shows the use mode of the number of color print sheets in the image forming apparatus transmitting the remedy request and FIG. 14A shows the use mode of the number of color print sheets in the normally operating image forming apparatus which is the same as or corresponds to the image forming apparatus involved in the use mode in FIG. 14A.

In FIGS. 14A and 14B, the elapsed time is indicated on a horizontal axis and the number of color print sheets is indicated on a vertical axis.

The use mode information summarizing section 1305 extracts the feature amounts based on the charts as in FIGS. 14A and 14B and calculates the difference between both pieces of the use mode information based on the feature amounts. If the calculated difference is equal to or less than a threshold value, it is determined that both pieces of the use mode information are the same or correspond to each other.

In this case, the use mode information summarizing section 1305 requests the setup state listing section 1306 to list the setup states of the same or corresponding use mode information pieces.

As an example of the feature amount, the change rate in a given time period, etc., exists in the case as shown in FIGS. 14A and 14B.

Upon reception of the request from the use mode information summarizing section 1305, the setup state listing section 1306 lists the setup values in each use mode of the same or corresponding use mode information pieces; in the example shown in FIGS. 14A and 14B, the setup state listing section 1306 lists the setup values for the use mode of the number of color print sheets.

Upon completion of listing the setup values, the setup state listing section 1306 requests the countermeasure determination section 1307 to determine countermeasures. Upon reception of the request for determining countermeasures, the countermeasure determination section 1307 calculates the variation degree (standard deviation) for the setup value list, for example, determines that a setup value with the variation degree smaller than a predetermined value, namely, a setup value with a small variation degree is a setup value for taking countermeasures, creates countermeasure information, and sends the countermeasure information to the information transmission section 1308. The setting may be determined using the average value of the setup values, etc., in place of the standard deviation as in Example 1 described above.

The information transmission section 1308 transmits the countermeasure information to the image forming apparatus making the remedy request.

Figure 15:
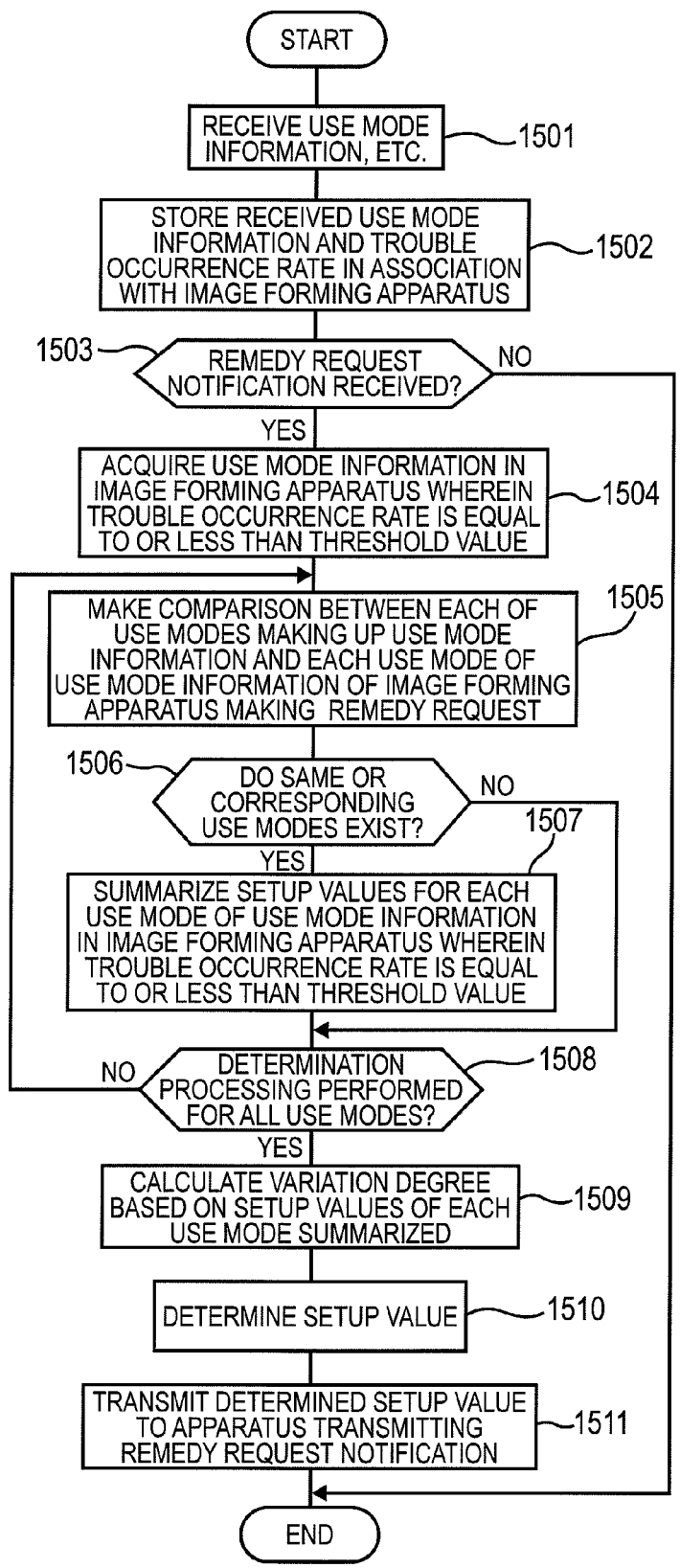
FIG. 15 is a flowchart to show a detailed flow of processing performed in the monitor server forming a part of the information processing system in the exemplary embodiment of the invention.

FIG. 15 is a flowchart to show a detailed flow of processing performed in the monitor server forming a part of the information processing system in the exemplary embodiment of the invention.

In FIG. 15, upon reception of use mode information, etc., from an image forming apparatus (1501), processing is started. The received use mode information, etc., is stored in association with identification information for identifying the image forming apparatus transmitting the use mode information, etc., (1502). The received information contains not only the use mode information, but also trouble occurrence rate information and a remedy request notification.

Whether or not the received information contains a remedy request notification of a notification of a making a request for a remedy for an operation malfunction of the image forming apparatus transmitting the use mode information, etc., or the like as well as the use mode information is determined (1503). If no remedy request notification is contained (NO at 1503), the processing is terminated.

In contrast, if use mode information containing a remedy request notification is received (YES at 1503), the following processing is performed for countermeasures against the operation malfunction, etc., occurring in the image forming apparatus transmitting the use mode information, etc.:

From the trouble occurrence rate information received from the image forming apparatus transmitting the remedy request notification, use mode information in an image forming apparatus wherein the trouble occurrence rate is equal to or less than a threshold value and the trouble occurrence percentage is small is acquired from the stored use mode information list (1504).

The acquired use mode information is made up of information groups indicating various use modes in the image forming apparatus, and a comparison is made between each of the use modes and each use mode of the use mode information transmitted together with the remedy request notification (1505).

As a result of the comparison, whether or not the use modes are the same or correspond to each other is determined (1506). For example, in the case as shown in FIGS. 14A and 14B, it is determined that the use modes correspond to each other. If it is determined that the use modes are the same or correspond to each other (YES at 1506), the setup values are summarized for each use mode of the use mode information in the image forming apparatus wherein the trouble occurrence rate is equal to or less than the threshold value (1507).

Subsequently, whether or not the above-described determination processing (1506) has been performed for all use modes is determined (1508). If the determination processing is not performed for all use modes (NO at 1508), processing of steps 1505 to 1507 is repeated for any other use mode.

When the determination processing has been performed for all use modes (YES at 1508), the variation degree of the setup values in each use mode is calculated according to the standard deviation (1509) and it is determined that the setup value with a small variation degree is a setup value used for taking countermeasures against the operation malfunction, etc., (1510).

When the setup value for the use mode is determined, countermeasure information containing the setup value is transmitted to the image forming apparatus transmitting the remedy request notification (1511).

A remedy is thus applied to the image forming apparatus transmitting the remedy request notification.

It is to be understood that the invention is not limited to Examples described above and shown in the accompanying drawings and various changes and modifications can be made without departing from the spirit and the scope of the invention.

In Example 2 described above, the information used as the use mode information may be a setup value, etc., found based on the use mode information which is the same as or corresponds to the use mode information of the image forming apparatus transmitting the trouble countermeasure information (of the use mode information of normally operating image forming apparatus) as in Example 3.

In Example 2 described above, to create a trouble prediction expression, a trouble prediction expression based on the use mode information of the normally operating image forming apparatus, of the same or corresponding use mode as or to the image forming apparatus where a fault or a defective condition occurred as in Example 3 rather than a trouble prediction expression based simply on the use mode information of the normally operating image forming apparatus may be created.

In the invention, the above-described operation is executed in an information processing system including a communication function or from a record medium (CD-ROM, DVD-ROM, etc.,) storing a program for implementing the above-described sections, the program is installed in a computer and is executed, whereby an information processing system for executing the above-described processing can also be implemented. A CPU (Central Processing Unit), ROM (Read-Only Memory), RAM (Random Access Memory), and a hard disk are connected to the computer for implementing the information processing system through a system bus. The CPU performs processing with the RAM as a work area in accordance with the program stored in the ROM or the hard disk.

A medium for supplying a program may be a communication medium (a medium for retaining a program temporarily or fluidly like a communication line or a communication system). For example, the program may be put up on a bulletin board system (BBS) of a communication network and may be distributed through a communication line.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A monitoring apparatus comprising:
a reception section that receives, respectively, use mode information pieces from a plurality of information processing apparatuses;
a storage section that stores, respectively, the use mode information pieces received by the reception section;
a transmission section that, if the reception section receives a trouble information piece contained in a use mode information piece from a faulty one of the plurality of information processing apparatuses, then transmits an information piece concerning countermeasures against a fault indicated by the trouble information piece to the faulty one of the plurality of information processing apparatuses;
a first collecting section that collects from the storage section, first use mode information pieces of first ones of the plurality of information processing apparatuses having a same model as the faulty one of the plurality of information processing apparatuses; and
a second collecting section that collects from the storage section, second use mode information pieces of second ones of the plurality of information processing apparatuses having the same model as the faulty one of the plurality of information processing apparatuses;
wherein the first use mode information pieces contain trouble information pieces indicating the same fault as the fault indicated by the faulty one of the plurality of information processing apparatuses,
wherein the second use mode information pieces do not contain trouble information pieces, thereby indicating that corresponding second ones of the plurality of information processing apparatuses operate normally, and
wherein the transmission section transmits the information piece concerning the countermeasures to the faulty one of the plurality of information processing apparatuses on the basis of a determination using the first use mode information pieces and the second use mode information pieces.

2. The monitoring apparatus according to claim 1, further comprising:
a creation section that, if the reception section receives the trouble information piece contained in the use mode information piece from the faulty one of the plurality of information processing apparatuses, then creates a fault prediction expression concerning the fault indicated by the trouble information piece using the first use mode information pieces and the second use mode information pieces;
a retention section that retains the fault prediction expression created by the creation section; and
a determination section that, if the reception section receives a use mode information piece from a normally operating one of the plurality of information processing apparatuses, then determines a fault possibility in the normally operating one of the plurality of information processing apparatuses based on a prediction result based on the fault prediction expression retained in the retention section,
wherein the transmission section transmits the information piece concerning the countermeasures against the fault indicated by the trouble information to the normally operating one of the plurality of information processing apparatuses based on the fault possibility determined by the determination section.

3. An information processing system comprising: a plurality of information processing apparatuses; and
a monitoring apparatus,
wherein each of the plurality of information processing apparatus comprises:
a first transmission section that transmits a use mode information piece concerning a use mode of one of the plurality of information processing apparatuses, if a fault occurs in the information processing apparatus, and
wherein the first transmission section transmits a trouble information piece concerning the fault of the information processing apparatus together with the use mode information piece to the monitoring apparatus,
wherein the monitoring apparatus comprises:
a reception section that receives, respectively, use mode information pieces from of the plurality of information processing apparatuses;
a storage section that stores, respectively, the use mode information pieces received by the reception section;
a transmission section that, if the reception section receives a trouble information piece contained in a use mode information piece from the a faulty one of the plurality of information processing apparatuses, then transmits an information piece concerning countermeasures against a fault indicated by the trouble information piece to the faulty one of the plurality of information processing apparatuses;
a first collecting section that collects from the storage section, first use mode information pieces of first ones of the plurality of information processing apparatuses having a same model as the faulty one of the plurality of information processing apparatuses; and
a second collecting section that collects from the storage section, second use mode information pieces of second ones of the plurality of information processing apparatuses having the same model as the faulty one of the plurality of information processing apparatuses;
wherein the first use mode information pieces contain trouble information pieces indicating the same fault as the fault indicated by the faulty one of the plurality of information processing apparatuses,
wherein the second use mode information pieces do not contain trouble information pieces, thereby indicating that corresponding second ones of the plurality of information processing apparatuses operate normally, and
wherein the transmission section transmits the information piece concerning the countermeasures to the faulty one of the plurality of information processing apparatuses on the basis of a determination using the first use mode information pieces and the second use mode information pieces.

4. A monitoring method comprising:
receiving, respectively, use mode information pieces from a plurality of information processing apparatuses;
storing, respectively, the received use mode information; and
transmitting, if a trouble information piece contained in use mode information piece is received from a faulty one of the plurality of information processing apparatuses, an information piece concerning countermeasures against a fault indicated by the trouble information piece to the faulty one of the plurality of information processing apparatuses;
collecting from the stored use mode information pieces, first use mode information pieces of first ones of the plurality of information processing apparatuses having a same model as the faulty one of the plurality of information processing apparatuses; and collecting from the stored use mode information pieces, second use mode information pieces of second ones of the plurality of information processing apparatuses having the same model as the faulty one of the plurality of information processing apparatuses;

wherein the first use mode information pieces contain trouble information pieces indicating the same fault as the fault fault indicated by the faulty one of the plurality of information processing apparatuses, wherein the second use mode information pieces do not contain trouble information pieces, thereby indicating that corresponding second ones of the plurality of information processing apparatuses operate normally, and wherein the monitoring method further comprises transmitting the information piece concerning the countermeasures to the faulty one of the plurality of information processing apparatuses on the basis of a determination using the first use mode information pieces and the second use mode information pieces.

5. A non-transitory computer readable medium storing a program causing a computer to execute a process for monitoring information processing apparatuses, the process comprising:

receiving, respectively, use mode information pieces from a plurality of information processing apparatuses;

storing, respectively, the received use mode information pieces; and transmitting, if a trouble information piece contained in a use mode information piece is received from a faulty one of the plurality of information processing apparatuses, an information piece concerning countermeasures against a fault indicated by the trouble information piece to the faulty one of the plurality of information processing apparatuses;

collecting from the stored use mode information pieces, first use mode information pieces of first ones of the plurality of information processing apparatuses having a same model as the faulty one of the plurality of information processing apparatuses; and collecting from the stored use mode information pieces, second use mode information pieces of second ones of the plurality of information processing apparatuses having the same model as the faulty one of the plurality of information processing apparatuses;

wherein the first use mode information pieces contain trouble information pieces indicating the same fault as the fault indicated by the faulty one of the plurality of information processing apparatuses, wherein the second use mode information pieces do not contain trouble information pieces, thereby indicating that corresponding second ones of the plurality of information processing apparatuses operate normally, and wherein the monitoring method further comprises transmitting the information piece concerning the countermeasures to the faulty one of the plurality of information processing apparatuses on the basis of a determination using the first use mode information pieces and the second use mode information pieces.

6. The monitoring apparatus according to claim 1, wherein the use mode information pieces have set items for information processing and set values corresponding to the set items.

* * * * *